United States Patent
Okahara

(10) Patent No.: US 10,871,224 B2
(45) Date of Patent: Dec. 22, 2020

(54) CONTROL DEVICE FOR CONTINUOUSLY VARIABLE TRANSMISSION AND CONTROL METHOD FOR CONTINUOUSLY VARIABLE TRANSMISSION

(71) Applicant: JATCO Ltd, Fuji (JP)

(72) Inventor: Ken Okahara, Fuji (JP)

(73) Assignee: JATCO LTD, Fuji (JP)

( * ) Notice: Subject to any disclaimer, the term of this patent is extended or adjusted under 35 U.S.C. 154(b) by 84 days.

(21) Appl. No.: 16/085,563

(22) PCT Filed: Feb. 23, 2017

(86) PCT No.: PCT/JP2017/006817
§ 371 (c)(1),
(2) Date: Sep. 14, 2018

(87) PCT Pub. No.: WO2017/159269
PCT Pub. Date: Sep. 21, 2017

(65) Prior Publication Data
US 2019/0154146 A1 May 23, 2019

(30) Foreign Application Priority Data
Mar. 17, 2016 (JP) .................. 2016-053308

(51) Int. Cl.
| | |
|---|---|
| *F16H 61/662* | (2006.01) |
| *F16H 59/70* | (2006.01) |
| *F16H 61/02* | (2006.01) |
| *F16H 61/70* | (2006.01) |
| *F16H 61/00* | (2006.01) |

(Continued)

(52) U.S. Cl.
CPC .......... *F16H 61/662* (2013.01); *F16H 59/70* (2013.01); *F16H 61/00* (2013.01); *F16H 61/0202* (2013.01); *F16H 61/702* (2013.01); *F16H 2059/366* (2013.01);
(Continued)

(58) Field of Classification Search
None
See application file for complete search history.

(56) References Cited

U.S. PATENT DOCUMENTS 4,458,318 A * 7/1984 Smit .................. B60W 30/18
474/12
4,793,454 A * 12/1988 Petzold ................ B60W 10/02
192/103 R (Continued)

FOREIGN PATENT DOCUMENTS

| JP | 11-194801 A | 7/1999 |
|---|---|---|
| JP | 2000-002322 A | 1/2000 |

(Continued)

*Primary Examiner* — Timothy Hannon
(74) *Attorney, Agent, or Firm* — Foley & Lardner LLP

(57) ABSTRACT

A controller executes a feedback control of a transmission so that an actual speed ratio reaches a target speed ratio. The controller includes first and second phase lead compensators configured to perform phase lead compensation of a feedback primary command pressure, a lead compensation on/off determination unit configured to determine to set on or off the phase lead compensation, and an advance amount filter unit configured to smooth a change of a gain according to on/off determination of the phase lead compensation when the phase lead compensation is on/off-switched.

5 Claims, 5 Drawing Sheets

(51) Int. Cl.
*F16H 59/36* (2006.01)
*F16H 59/68* (2006.01)

(52) U.S. Cl.
CPC .............. *F16H 2059/6807* (2013.01); *F16H 2059/706* (2013.01); *F16H 2061/0078* (2013.01)

(56) References Cited

U.S. PATENT DOCUMENTS

| | | | |
|---|---|---|---|
| 5,189,611 A * | 2/1993 | Petzold | ............. F16H 61/66254 |
| | | | 477/98 |
| 5,993,338 A | 11/1999 | Kato et al. | |
| 2005/0192133 A1* | 9/2005 | Oshiumi | ........... F16H 61/66272 |
| | | | 474/18 |
| 2012/0083953 A1* | 4/2012 | Izawa | ................... B60W 30/20 |
| | | | 701/22 |

FOREIGN PATENT DOCUMENTS

| | | |
|---|---|---|
| JP | 2000-018378 A | 1/2000 |
| JP | 2000-193080 A | 7/2000 |
| JP | 2002-106700 A | 4/2002 |
| JP | 2014-073729 A | 4/2014 |

\* cited by examiner

CONTROL DEVICE FOR CONTINUOUSLY VARIABLE TRANSMISSION AND CONTROL METHOD FOR CONTINUOUSLY VARIABLE TRANSMISSION

CROSS-REFERENCE TO RELATED APPLICATIONS

This application is a National Phase of International Patent Application No. PCT/JP2017/006817, filed Feb. 23, 2017, which claims priority to Japanese Patent Application No. 2016-053308, filed Mar. 17, 2016. The contents of these applications are herein incorporated by reference in their entirety.

TECHNICAL FIELD

The present invention relates to a control device for continuously variable transmission and a control method for continuously variable transmission.

BACKGROUND ART

Concerning a shift control of a continuously variable transmission, a technique for advancing a target speed ratio for compensation by a response delay of an actual speed ratio with respect to the target speed ratio is disclosed in JP2002-106700A.

SUMMARY OF INVENTION

In a continuously variable transmission, front-rear vibration may occur which induces shaking in a front-rear direction at a resonant frequency of a power train. The front-rear vibration is thought to occur with a torque variation of the power train and a shift of the continuously variable transmission coupled when the stability of a speed ratio of the continuously variable transmission with respect to the torque variation lacks. Thus, to suppress the front-rear vibration, it is considered to enhance the stability of the speed ratio of the continuously variable transmission by performing lead compensation of a target speed ratio if necessary.

However, in the case of switching an execution/stop of the lead compensation, an execution/stop command of the lead compensation hunts between an execution command and a stop command, with the result that noise corresponding to a hunting period is possibly generated. Such noise is input to increase a gain of the lead compensation, thereby making a shift control of the continuously variable transmission unstable, with the result that the behavior of a vehicle equipped with the continuously variable transmission may be affected.

The present invention was developed in view of such a problem and aims to provide a control device for continuously variable transmission and a control method for continuously variable transmission capable of improving an influence on the behavior of a vehicle equipped with a continuously variable transmission due to the switching of an execution/stop of lead compensation.

A control device for continuously variable transmission according to a certain aspect of the present invention is a control device for continuously variable transmission for executing a feedback control on the basis of an actual value representing a state of a continuously variable transmission. The control device includes a lead compensation unit configured to perform lead compensation of the feedback control, an execution/stop determination unit configured to determine an execution/stop of the lead compensation, and a gain smoothing unit configured to smooth a gain change of the lead compensation according to execution/stop determination of the lead compensation when the execution/stop of the lead compensation is switched.

According to another aspect of the present invention, a control method for continuously variable transmission for executing a feedback control on the basis of an actual value representing a state of a continuously variable transmission is provided. The control method includes performing lead compensation of the feedback control, determining an execution/stop of the lead compensation, and smoothing a gain change of the lead compensation according to execution/stop determination of the lead compensation when the execution/stop of the lead compensation is switched.

According to these aspects, a change amount of gain associated with on/off switch of lead compensation can be suppressed by smoothing change of the gain. Thus, even if periodic noise corresponding to hunting of on/off-command of the lead compensation is generated, it can be prevented and suppressed that the gain increases and shift control of a continuously variable transmission becomes unstable due to input of such noise. Thus, even in the case of on/off-switching of the lead compensation, it can be improved that the behavior of a vehicle equipped with the continuously variable transmission is affected by this.

DESCRIPTION OF EMBODIMENT

Hereinafter, an embodiment of the present invention is described with reference to the accompanying drawings.

Figure 1:
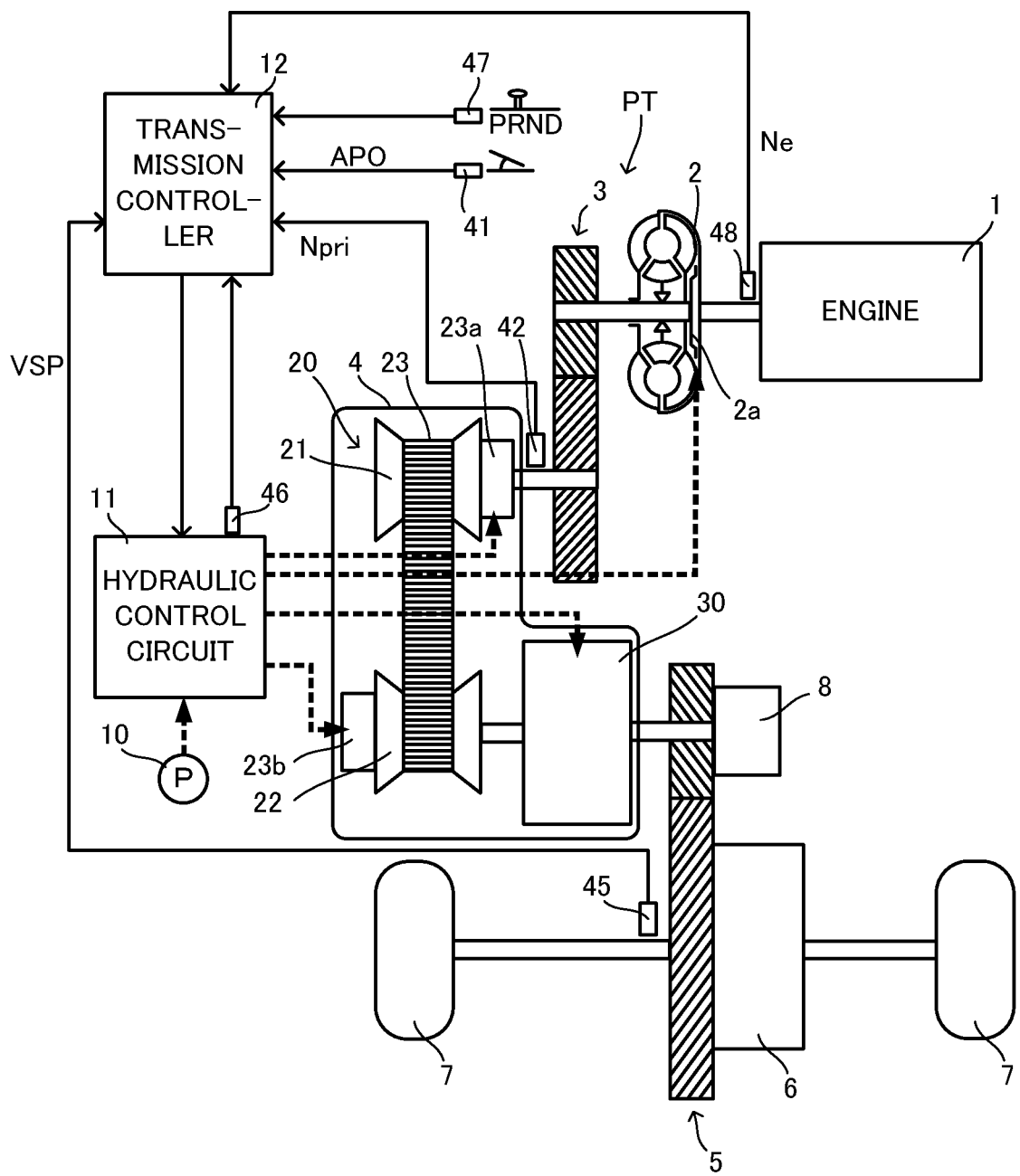
FIG. 1 is a schematic configuration diagram of a vehicle including a transmission controller.

FIG. 1 is a schematic configuration diagram of a vehicle including a transmission controller 12. The vehicle includes an engine 1 as a power source. Power of the engine 1 is transmitted to drive wheels 7 via a torque converter 2, a first gear train 3, a transmission 4, a second gear train 5 and a differential device 6 which constitute a power train PT. The second gear train 5 is provided with a parking mechanism 8 for mechanically unrotatably locking an output shaft of the transmission 4 in parking.

The torque converter 2 includes a lock-up clutch 2a. When the lock-up clutch 2a is engaged, there is no more slip in the torque converter 2 and transmission efficiency of the torque converter 2 is improved. The lock-up clutch 2a is referred to as a LU clutch 2a below.

The transmission 4 is a continuously variable transmission including a variator 20. The variator 20 is a continuously variable transmission mechanism including a pulley 21 serving as a primary pulley, a pulley 22 serving as a secondary pulley and a belt 23 mounted between the pulleys 21 and 22. The pulley 21 constitutes a driving side rotary element and the pulley 22 constitutes a driven side rotary element.

Each of the pulleys 21, 22 includes a fixed conical plate, a movable conical plate arranged with a sheave surface facing the fixed conical plate and forming a V groove between the fixed conical plate and the movable conical plate, and a hydraulic cylinder provided on a back surface of the movable conical plate for displacing the movable conical plate in an axial direction. The pulley 21 includes a hydraulic cylinder 23a as the hydraulic cylinder and the pulley 22 includes a hydraulic cylinder 23b as the hydraulic cylinder.

If a hydraulic pressure to be supplied to the hydraulic cylinder 23a, 23b is adjusted, a width of the V groove changes to change a contact radius of the belt 23 and each pulley 21, 22, whereby a speed ratio of the variator 20 continuously changes. The variator 20 may be a toroidal type continuously variable transmission mechanism.

The transmission 4 further includes a sub-transmission mechanism 30. The sub-transmission mechanism 30 is a transmission mechanism with two forward speeds and one reverse speed and has a first-speed and a second-speed having a smaller speed ratio than the first-speed as forward gear positions. The sub-transmission mechanism 30 is provided in series with the variator 20 in a power transmission path from the engine 1 to the drive wheels 7.

The sub-transmission mechanism 30 may be directly connected to an output shaft of the variator 20 as in this example or may be connected via another shift or power transmission mechanism such as a gear train. Alternatively, the sub-transmission mechanism 30 may be connected to an input shaft side of the variator 20.

The vehicle is further provided with an oil pump 10 to be driven utilizing part of the power of the engine 1, a hydraulic control circuit 11 for adjusting a hydraulic pressure generated by the supply of oil by the oil pump 10 and supplying the adjusted hydraulic pressure to each part of the transmission 4, and a transmission controller 12 for controlling the hydraulic control circuit 11.

The hydraulic control circuit 11 is composed of a plurality of flow passages and a plurality of hydraulic control valves. The hydraulic control circuit 11 switches a hydraulic pressure supply path by controlling the plurality of hydraulic control valves on the basis of a shift control signal from the transmission controller 12. Further, the hydraulic control circuit 11 adjusts a necessary hydraulic pressure from the hydraulic pressure generated by the supply of the oil by the oil pump 10 and supplies the adjusted hydraulic pressure to each part of the transmission 4. In this way, the speed of the variator 20 is changed, the gear position of the sub-transmission mechanism 30 is changed and the LU clutch 2a is engaged/disengaged.

Figure 2:
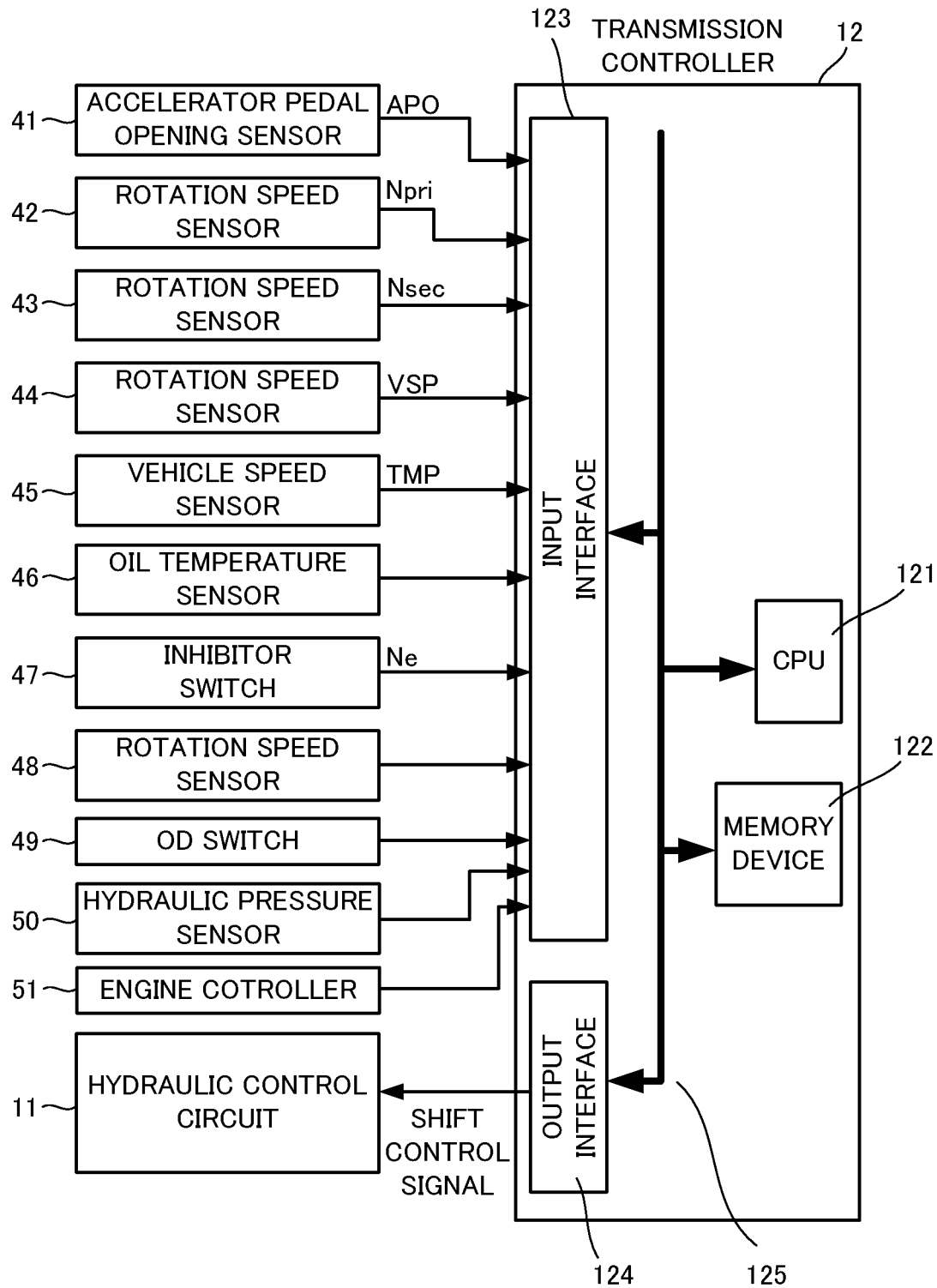
FIG. 2 is a schematic configuration diagram of the transmission controller.

FIG. 2 is a schematic configuration diagram of the transmission controller 12. The transmission controller 12 includes a CPU 121, a memory device 122 composed of a RAM and a ROM, an input interface 123, an output interface 124 and a bus 125 for connecting these components to each other.

To the input interface 123 are, for example, input an output signal of an accelerator pedal opening sensor 41 for detecting an accelerator pedal opening APO representing an operated amount of an accelerator pedal, an output signal of a rotation speed sensor 42 for detecting an input side rotation speed of the transmission 4, an output signal of a rotation speed sensor 43 for detecting a rotation speed Nsec of the pulley 22 and an output signal of a rotation speed sensor 44 for detecting an output side rotation speed of the transmission 4.

The input side rotation speed of the transmission 4 is, specifically, a rotation speed of an input shaft of the transmission 4, thus, a rotation speed Npri of the pulley 21. The output side rotation speed of the transmission 4 is, specifically, a rotation speed of the output shaft of the transmission 4, thus, a rotation speed of an output shaft of the sub-transmission mechanism 30. The input side rotation speed of the transmission 4 may be a rotation speed at a position opposite to the transmission 4 across the gear train or the like such as a turbine rotation speed of the torque converter 2. The same holds true for the output side rotation speed of the transmission 4.

To the input interface 123 are further input an output signal of a vehicle speed sensor 45 for detecting a vehicle speed VSP, an output signal of an oil temperature sensor 46 for detecting an oil temperature TMP of the transmission 4, an output signal of an inhibitor switch 47 for detecting the position of a select lever, an output signal of a rotation speed sensor 48 for detecting a rotation speed Ne of the engine 1, an output signal of an OD switch 49 for enlarging a shift range of the transmission 4 to a speed ratio smaller than 1, an output signal of a hydraulic pressure sensor 50 for detecting a hydraulic pressure to be supplied to the LU clutch 2a and the like. A torque signal of an engine torque Te is also input to the input interface 123 from an engine controller 51 provided in the engine 1.

A shift control program for the transmission 4, various maps used in the shift control program and the like are stored in the memory device 122. The CPU 121 reads and executes the shift control program stored in the memory device 122 and generates a shift control signal on the basis of various signals input via the input interface 123. Further, the CPU 121 outputs the generated shift control signal to the hydraulic control circuit 11 via the output interface 124. Various values used in computations by the CPU 121 and computation results of the CPU 121 are appropriately stored in the memory device 122.

In the transmission 4, front-rear vibration may occur at a PT resonant frequency Fpt, which is a resonant frequency of the power train PT. The front-rear vibration is thought to occur with a torque variation of the power train PT and a shift of the transmission 4 coupled when the stability of the speed ratio of the transmission 4 with respect to the torque variation lacks. Thus, it is considered to suppress the front-rear vibration by enhancing the stability of the speed ratio of the transmission 4 by performing lead compensation if necessary.

However, in the case of on/off switching the lead compensation, i.e. switching an execution/stop of the lead compensation, the behavior of the vehicle equipped with the transmission 4 may be affected as described next.

Figure 3:
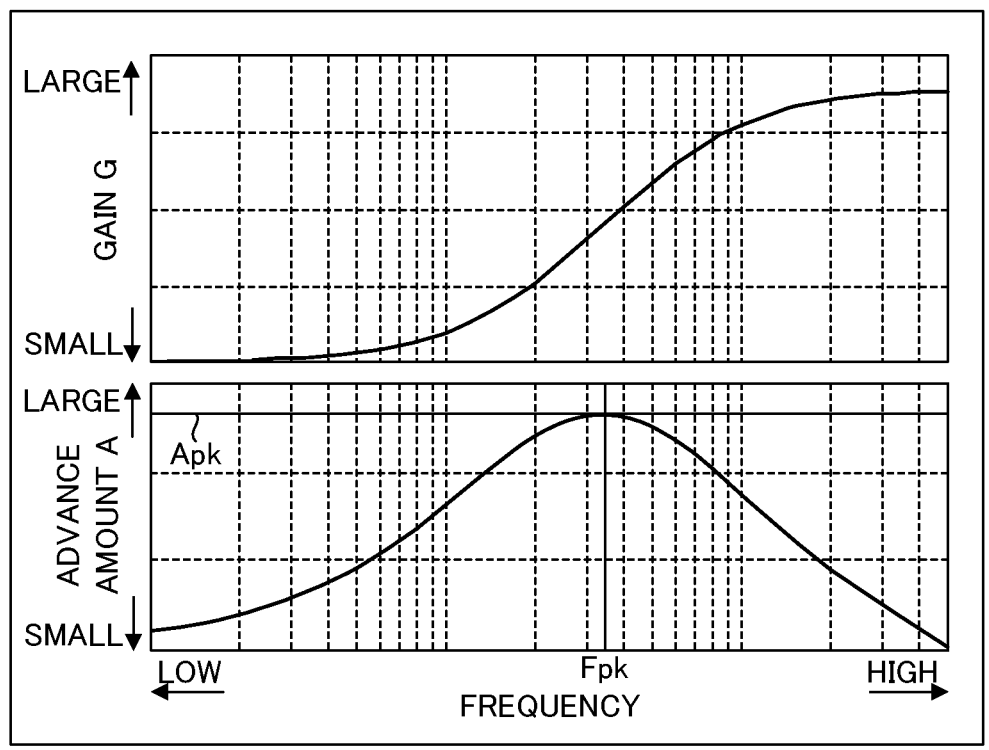
FIG. 3 is a graph showing an example of a Bode diagram of a phase lead compensator.

FIG. 3 is a graph showing an example of a Bode diagram of a phase lead compensator. A horizontal axis of the Bode diagram represents a frequency in logarithm. FIG. 3 shows a case where second-order phase lead compensation is performed. A peak value frequency Fpk is set according to a frequency targeted in the phase lead compensation. The targeted frequency is specifically the PT resonant frequency Fpt. Thus, the peak value frequency Fpk is, for example, set at the PT resonant frequency Fpt. The PT resonant frequency is, for example, 2 Hz and can be a constant value. An advance amount Apk indicates an advance amount A corresponding to the peak value frequency Fpk.

As shown in FIG. 3, in the case of performing the phase lead compensation, a gain G increases with an increase in frequency. If the gain G of the phase lead compensation increases, the shift control of the transmission 4 becomes unstable and the behavior of the vehicle equipped with the transmission 4 may be affected. The gain G tends to be higher in the case of second-order than in the case of first-order, but similarly becomes higher also in the case of the first-order.

Concerning the above concern, in the case of on/off switching the phase lead compensation, an on/off-command, which is an execution/stop command of the phase lead compensation, hunts between an on-command and an off-command, with the result that noise corresponding to a hunting period is possibly generated. Such noise is input to a phase lead compensator and increased by the gain G, whereby the behavior of the vehicle equipped with the transmission 4 may be affected. Specifically, the resonance of the power train PT is stimulated by the increased noise and the front-rear vibration originally trying to be suppressed by the phase lead compensation occurs, with the result that the behavior of the vehicle equipped with the transmission 4 may be affected.

Thus, the controller 12 executes a shift control as described below. In the following description, a speed ratio Ratio of the variator 20 is used as a speed ratio of the transmission 4. The speed ratio Ratio is a general term for the speed ratios of the variator 20 including an actual speed ratio Ratio_A, a target speed ratio Ratio_D and a destination speed ratio Ratio_T to be described later and includes at least any one of these. The same holds true for a primary pressure Ppri, which is a hydraulic pressure to be supplied to the pulley 21. The speed ratio of the transmission 4 may be a through speed ratio, which is an overall speed ratio of the variator 20 and the sub-transmission mechanism 30. Hereinafter, the transmission controller 12 is merely referred to as the controller 12.

Figure 4:
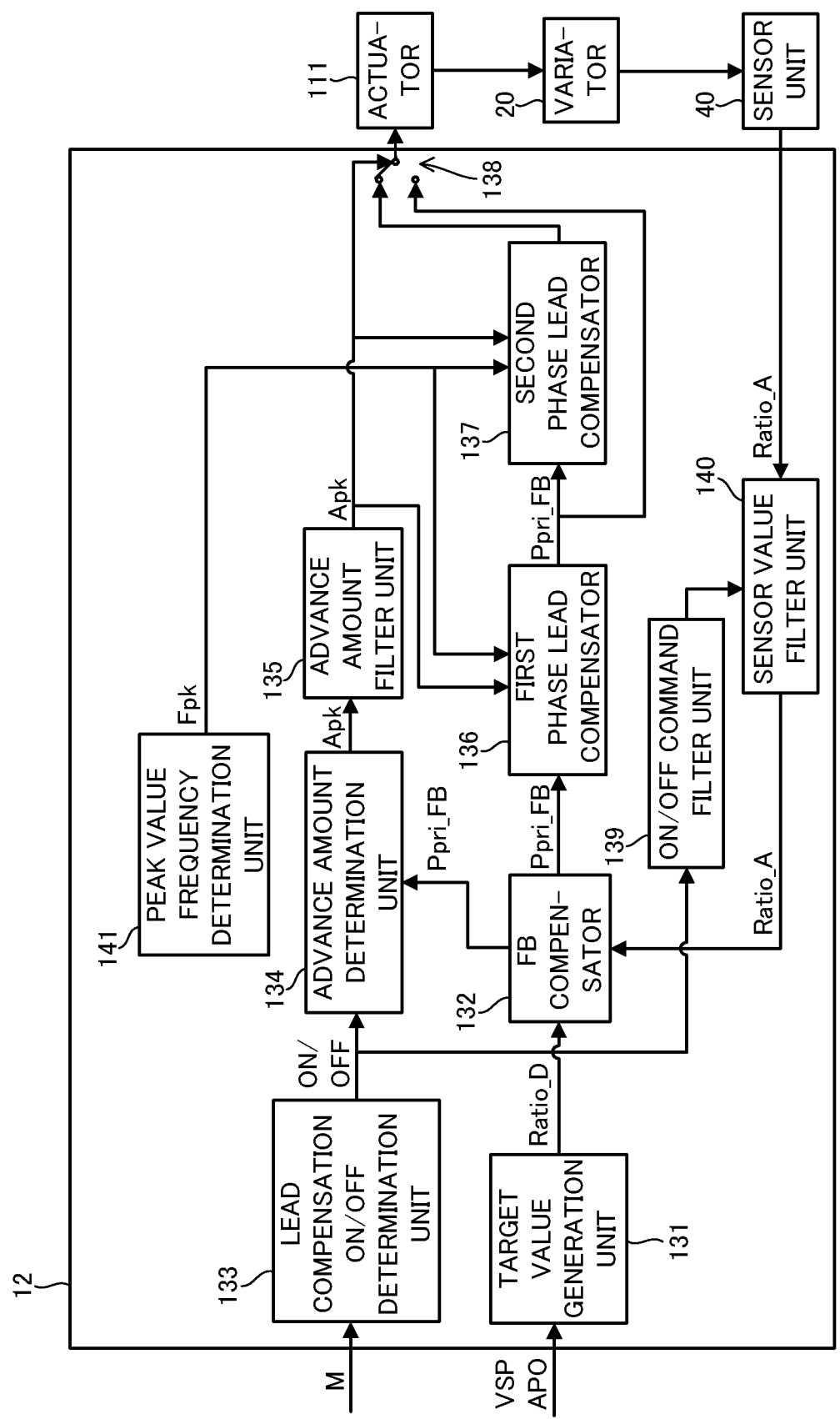
FIG. 4 is a diagram showing an example of a function block diagram of the transmission controller.

FIG. 4 is a diagram showing an example of a feedback function block diagram of the controller 12 showing essential parts of the shift control. The controller 12 includes a target value generation unit 131, an FB compensator 132, a lead compensation on/off determination unit 133, an advance amount determination unit 134, an advance amount filter unit 135, a first phase lead compensator 136, a second phase lead compensator 137, a switch unit 138, an off/off-command filter unit 139, a sensor value filter unit 140 and a peak value frequency determination unit 141. FB is an abbreviation of feedback.

The target value generation unit 131 generates a target value of the shift control. The target value is specifically the target speed ratio Ratio_D based on the destination speed ratio Ratio_T, which is a final target shift control value using the speed ratio Ratio as a shift control value. The shift control value may be, for example, the primary pressure Ppri serving as a control parameter.

The destination speed ratio Ratio_T is set in advance according to the running state of the vehicle in a shift map. Thus, the target value generation unit 131 reads a corresponding destination speed ratio Ratio_T from the shift map on the basis of the detected running state. The running state of the vehicle is specifically represented by the vehicle speed VSP and the accelerator pedal opening APO.

The target value generation unit 131 calculates the target speed ratio Ratio_D on the basis of the destination speed ratio Ratio_T. The target speed ratio Ratio_D is a transient target speed ratio until the destination speed ratio Ratio_T is reached and constitutes a target shift control value. The calculated target speed ratio Ratio_D is input to the FB compensator 132.

The FB compensator 132 calculates a feedback command value on the basis of the actual speed ratio Ratio_A, which is an actual value of the speed ratio Ratio, and the target speed ratio Ratio_D. The feedback command value is, for example, a feedback primary command pressure Ppri_FB for correcting an error between the actual speed ratio Ratio_A and the target speed ratio Ratio_D. The calculated feedback command value (feedback primary command pressure Ppri_FB) is input to the advance amount determination unit 134 and the first phase lead compensator 136.

The lead compensation on/off determination unit 133 determines to set on or off phase lead compensation of the feedback primary command pressure Ppri_FB. The lead compensation on/off determination unit 133 determines to set on or off the phase lead compensation according to pulley state values M. The pulley state values M are values for determining whether or not the pulleys 21, 22 are in a state where the front-rear vibration occurs, and include the rotation speed Npri, an input torque Tsec to the pulley 22, the speed ratio Ratio and a change rate α of the speed ratio Ratio.

The input torque Tsec can be calculated, for example, as a value obtained by multiplying the engine torque Te by a speed ratio set between the engine 1 and the pulley 22, thus, a gear ratio of the first gear train 3 and the speed ratio of the variator 20 in the present embodiment. The actual speed ratio Ratio_A and the target speed ratio Ratio_D can be applied as the speed ratio Ratio. The speed ratio Ratio may be the actual speed ratio Ratio_A or the target speed ratio Ratio_D.

The lead compensation on/off determination unit 133 specifically determines to set on or off the phase lead compensation of the feedback primary command pressure Ppri_FB according to all of four parameters including the rotation speed Npri, the input torque Tsec, the speed ratio Ratio and the change rate α. The lead compensation on/off determination unit 133 may be configured to determine to set on or off the phase lead compensation according to at least any one of the parameters out of the input torque Tsec, the speed ratio Ratio and the change rate α.

The lead compensation on/off determination unit 133 determines to set on or off the phase lead compensation of the feedback primary command pressure Ppri_FB according to an engaged state of the LU clutch 2a, a state of a driver operation to the transmission 4 and the presence or absence of a fail in addition to the pulley state values M.

Figure 5:
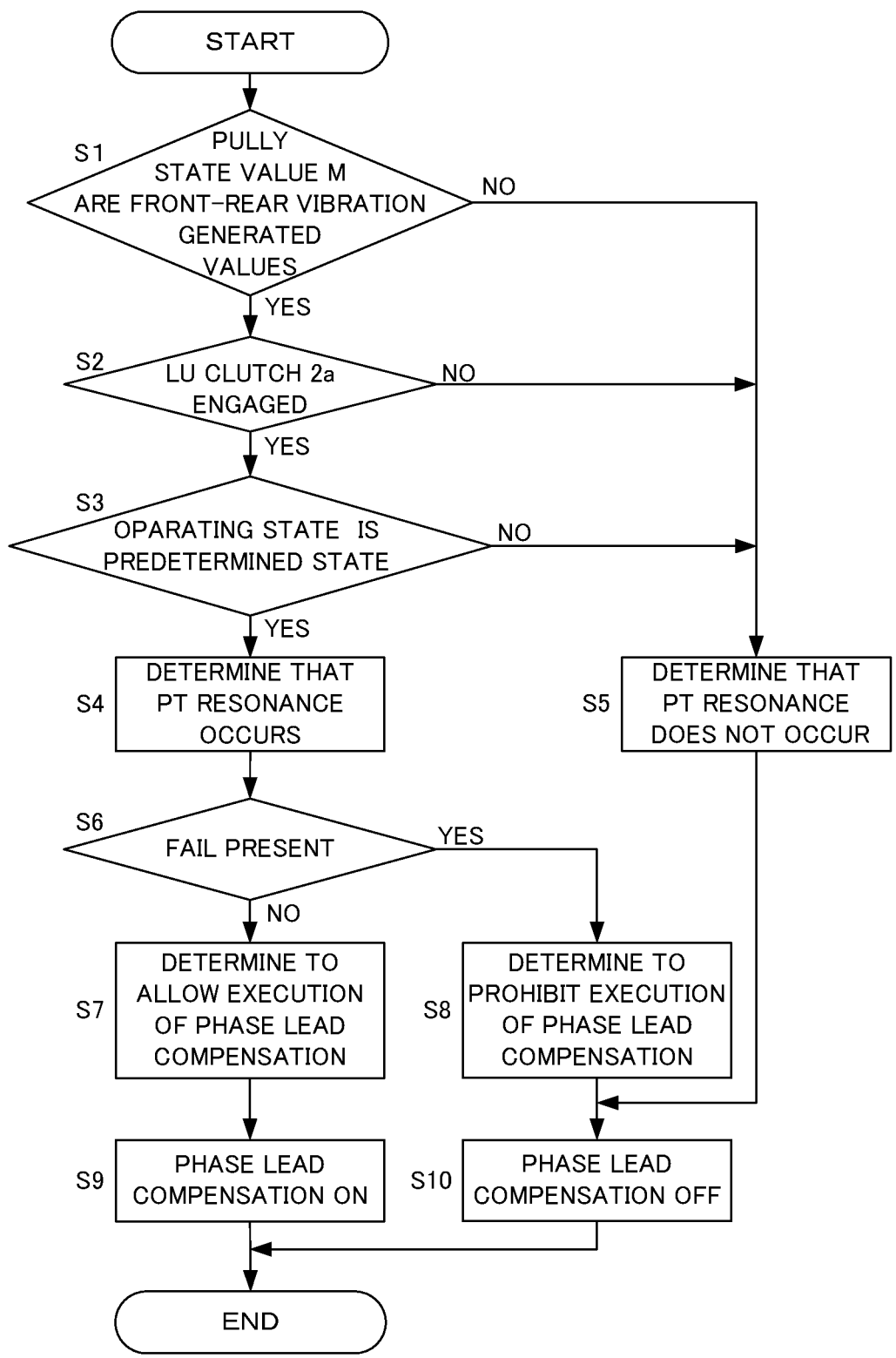
FIG. 5 is a flow chart showing an example of a control executed by the transmission controller.

FIG. 5 is a flow chart showing an example of a process performed by the controller 12. The process of this flow chart is specifically performed by the lead compensation on/off determination unit 133.

A process from Step S1 to Step S5 is a process for determining whether or not the power train PT resonates, in other words, a process for determining whether or not the front-rear vibration of the transmission 4 occurs. The resonance of the power train PT is referred to as PT resonance below.

In Step S1, the controller 12 determines whether or not the pulley state values M are values generated by the front-rear vibration. That is, whether or not the pulleys 21, 22 are in a state where the front-rear vibration occurs is determined in Step S1. In Step S1, the controller 12 makes the following determination for each of the rotation speed Npri, the input torque Tsec, the speed ratio Ratio and the change rate α of the speed ratio Ratio, which are the pulley state values M.

For the rotation speed Npri and the input torque Tsec, the controller 12 determines whether or not an operating point corresponding to the rotation speed Npri and the input torque Tsec is in a determination region specified according to these. The controller 12 determines that the rotation speed Npri and the input torque Tsec are front-rear vibration generated values if the operating point is in the determination region. A case where the operating point is in the determination region is, in other words, a case where the pulleys 21, 22 are vulnerable to disturbance, i.e. a case where the stability of the speed ratio Ratio lacks. The determination region can be set in advance by an experiment or the like.

For the speed ratio Ratio, the controller 12 determines that the speed ratio Ratio is the front-rear vibration generated value if the speed ratio Ratio is larger than a predetermined speed ratio Ratio1, in other words, on a lower side than the predetermined speed ratio Ratio1. The predetermined speed ratio Ratio1 is a value for specifying a speed ratio at which the front-rear vibration occurs and, for example, 1. The predetermined speed ratio Ratio1 can be set in advance by an experiment or the like.

For the change rate $\alpha$, the controller 12 determines that the change rate $\alpha$ of the speed ratio Ratio is the front-rear vibration generated value if the change rate $\alpha$ is smaller than a predetermined value $\alpha 1$. The predetermined value $\alpha 1$ is a value for specifying the change rate $\alpha$ at which the front-rear vibration occurs and a case where the change rate $\alpha$ is smaller than the predetermined value $\alpha 1$ corresponds to a case where the speed ratio Ratio is in a steady state. The predetermined value $\alpha 1$ can be set in advance by an experiment or the like.

In Step S1, the controller 12 determines in the affirmative if all of these pulley state values M are determined to be the front-rear vibration generated values and determines in the negative if any one of these pulley state values M is determined not to be the front-rear vibration generated value.

In the case of negative determination in Step S1, the process proceeds to Step S5 and the controller 12 determines that the PT resonance does not occur. Thus, it is determined that the front-rear vibration does not occur. In this case, the process proceeds to Step S10 and the controller 12 sets off the phase lead compensation. After Step S10, the process of this flow chart is finished.

In the case of affirmative determination in Step S1, the process proceeds to Step S2 and the controller 12 determines whether or not the LU clutch 2a is engaged. In this way, whether or not to set the phase lead compensation is determined according to the engaged state of the LU clutch 2a.

If the determination is negative in Step S2, the LU clutch 2a is not engaged, wherefore it is determined that the front-rear vibration does not occur. In this case, the process proceeds to Step S5. If the determination is affirmative in Step S2, the LU clutch 2a is judged to be in a state where the front-rear vibration occurs. In this case, the process proceeds to Step S3.

In Step S3, the controller 12 determines whether or not the state of the driver operation to the transmission 4 is a predetermined state. The predetermined state includes at least either one of a first operating state where the speed ratio Ratio is larger than the predetermined speed ratio Ratio1 and a second operating state where the speed ratio Ratio is in a steady state.

The first operating state is, for example, a state where the OD switch 49 is off. The second operating state is a state where the speed ratio Ratio is fixed by the driver operation such as a state where a manual range is selected by the select lever or a state where a manual mode such as a sport mode is selected.

By determining whether or not the state of the driver operation is the predetermined state, it can be determined that the speed ratio Ratio is continuously larger than the predetermined speed ratio Ratio1 and that the speed ratio Ratio is continuously in the steady state. Thus, it can be more reliably determined that the speed ratio Ratio is in the state where the front-rear vibration occurs.

If the determination is negative in Step S3, the state of the driver operation is not the predetermined state, wherefore it is determined that the front-rear vibration does not occur. In this case, the process proceeds to Step S5. If the determination is affirmative in Step S3, the process proceeds to Step S4.

In Step S4, the controller 12 determines that the PT resonance occurs. Thus, it is determined that the front-rear vibration occurs. After Step S4, the process proceeds to Step S6.

In Steps S6 to S8, whether or not the phase lead compensation can be set on is determined. In other words, it is determined whether or not it is possible to perform the phase lead compensation.

In Step S6, the controller 12 determines the presence or absence of a fail. The fail can be any one of fails of the transmission 4 including fails of the hydraulic control circuit 11, sensors and switches used in the shift control of the transmission 4. The fail may be any one of fails of the vehicle including the fails of the transmission 4.

If the determination is affirmative in Step S6, the process proceeds to Step S8 and the controller 12 determines that the phase lead compensation should not be set on. That is, determination is given to prohibit the execution of the phase lead compensation. After Step S8, the process proceeds to Step S10.

If the determination is negative in Step S6, the process proceeds to Step S7 and the controller 12 determines that the phase lead compensation may be set on. That is, determination is given to allow the execution of the phase lead compensation. In this case, the process proceeds to Step S9 and the controller 12 sets on the phase lead compensation. After Step S9, the process of this flow chart is finished.

Referring back to FIG. 4, the lead compensation on/off determination unit 133 outputs an on-command when determining to set on the phase lead compensation, and outputs an off-command when determining to set off the phase lead compensation. The on/off-command is input to the advance amount determination unit 134 and the on/off-command filter unit 139 from the lead compensation on/off determination unit 133.

The advance amount determination unit 134 determines the advance amount Apk. The advance amount determination unit 134 is provided downstream of the lead compensation on/off determination unit 133. The advance amount determination unit 134 is provided in this way due to an arrangement in a signal path. The advance amount determination unit 134 determines the advance amount Apk according to the on/off-command, in other words, according to on/off determination of the phase lead compensation. The advance amount determination unit 134 determines the advance amount Apk to be zero if the off-command is input. The advance amount determination unit 134 determines the advance amount Apk to be a first advance amount Apk1 or a second advance amount Apk2 if the on-command is input.

The first advance amount Apk1 is set to correspond to a case where first-order phase lead compensation to be described later is performed, and the second advance amount Apk2 is set to correspond to a case where second-order phase lead compensation to be described later is performed. The second advance amount Apk2 is ½ of the first advance amount Apk1. The first advance amount Apk1 is, for example, 80 deg and can be a constant value. The first advance amount Apk1 can be set in advance by an experiment or the like. The advance amount Apk is input to the advance amount filter unit 135 and the peak value frequency determination unit 141 from the advance amount determination unit 134.

The advance amount filter unit 135 is provided downstream of the advance amount determination unit 134 and performs a filtering process of the advance amount Apk. The advance amount filter unit 135 is provided in this way due to the arrangement in the signal path. The advance amount filter unit 135 is specifically a low pass filter unit and constituted, for example, by a first-order low pass filter.

The advance amount filter unit 135 constitutes a gain smoothing unit configured to smooth a change of the gain G of the phase lead compensation corresponding to the on/off determination of the phase lead compensation when the lead compensation is on/off-switched by performing the filtering process of the advance amount Apk. By smoothing the change of the gain G, a change amount of the gain G associated with the on/off switch of the phase lead compensation is suppressed.

The advance amount Apk is input to the first phase lead compensator 136, the second phase lead compensator 137 and the switch unit 138 from the advance amount filter unit 135. The peak value frequency Fpk is also input to the first and second phase lead compensators 136, 137 from the peak value frequency determination unit 141.

The both first and second phase lead compensators 136, 137 perform the first-order phase lead compensation of the feedback primary command pressure Ppri_FB on the basis of the input advance amount Apk and further the input peak value frequency Fpk. By performing the phase lead compensation of the feedback primary command pressure Ppri_FB, the phase lead compensation of the feedback shift control of the transmission 4 is performed. The first and second phase lead compensators 136, 137 are specifically constituted by first-order low pass filters and perform the first-order phase lead compensation of the feedback primary command pressure Ppri_FB by performing the filtering process corresponding to the input advance amount Apk and, further, the input peak value frequency Fpk.

The second phase lead compensator 137 is provided in series with the first phase lead compensator 136. The second phase lead compensator 137 is provided in this way due to the arrangement in the signal path. The feedback primary command pressure Ppri_FB having the first-order phase lead compensation performed thereon by the first phase lead compensator 136 is input to the second phase lead compensator 137.

Accordingly, the second phase lead compensator 137 further performs the first-order phase lead compensation in the case of performing the first-order phase lead compensation of the feedback primary command pressure Ppri_FB. In this way, the second-order phase lead compensation of the feedback primary command pressure Ppri_FB is performed. The second phase lead compensator 137 constitutes a lead compensation unit together with the first phase lead compensator 136.

The switch unit 138 switches, according to the input advance amount Apk, between a case where the phase lead compensation is performed by the first and second phase lead compensators 136, 137, i.e. a case where the second-order phase lead compensation is performed, and a case where the phase lead compensation is performed only by the first phase lead compensator 136, i.e. a case where the first-order phase lead compensation is performed for the following reasons.

By performing the second-order phase lead compensation, it is possible to suppress an increase of the gain G and suppress the instability of the shift control as compared to the case where the first-order phase lead compensation is performed. Further, if the advance amount A of the first-order phase lead compensation corresponding to the feedback primary command pressure Ppri_FB is smaller than a predetermined value A1, a gain suppressing effect cannot be expected, whereas a situation where the gain G decreases due to a frequency deviation and the damping effect is easily reduced can be avoided by performing the first-order phase lead compensation. The predetermined value A1 can be preferably set at a minimum value within a range where the gain suppressing effect by the second-order phase lead compensation is obtained.

In performing the phase lead compensation in this way, the advance amount determination unit 134 and the switch unit 138 are specifically configured as follows.

Specifically, the advance amount determination unit 134 calculates the advance amount A of the first-order phase lead compensation of the feedback primary command pressure Ppri_FB on the basis of the input feedback primary command pressure Ppri_FB. The advance amount determination unit 134 judges to perform the first-order phase lead compensation if the advance amount A is smaller than the predetermined value A1, and determines the advance amount Apk as the first advance amount Apk1. Further, the advance amount determination unit 134 judges to perform the second-order phase lead compensation if the advance amount A is equal to or larger than the predetermined value A1, and determines the advance amount Apk as the second advance amount Apk2. The advance amount A can be set in advance using map data or the like.

The switch unit 138 switches to perform the phase lead compensation only by the first phase lead compensator 136 if the first advance amount Apk1 is input. Further, the switch unit 138 switches to perform the phase lead compensation by the first and second phase lead compensators 136, 137 if the second advance amount Apk2 is input.

By this configuration, the first and second phase lead compensators 136, 137 are configured to perform the phase lead compensation only by the first phase lead compensator 136 according to the advance amount A. Further, the first and second phase lead compensators 136, 137 are configured to perform the phase lead compensation only by the first phase lead compensators 136 if the advance amount A is smaller than the predetermined value A1.

The switch unit 138 may be configured to perform the phase lead compensation only by the second phase lead compensator 137 in the case of performing the first-order phase lead compensation. The advance amount determination unit 134 may input the advance amount A to the switch unit 138 instead of the advance amount Apk and the switch unit 138 may switch on the basis of the thus input advance amount A. In this way, the first-order and second-order phase lead compensations can be properly performed even if smoothing is applied to the first and second advance amounts Apk1 and Apk2.

The switch unit 138 constitutes, together with the lead compensation on/off determination unit 133, a setting unit configured to set the feedback primary command pressure Ppri_FB having the lead compensation performed thereon by at least either one of the first and second phase lead compensators 136, 137 as the feedback primary command pressure Ppri_FB according to the pulley state values M. At least either one of the first and second phase lead compensators 136, 137 constitutes the lead compensation unit configured to perform the lead compensation of the feedback primary command pressure Ppri_FB. The feedback primary command pressure Ppri_FB having the lead compensation performed thereon constitutes the feedback primary command pressure Ppri_FB after the compensation.

An unillustrated primary command pressure Ppri_FF set on the basis of the feedback primary command pressure Ppri_FB selected from the switch unit 138 and the target speed ratio Ratio_D (target primary command pressure for determining a balance thrust and the speed ratio) is input to an actuator 111. The actuator 111 is, for example, a primary pressure control valve provided in the hydraulic control circuit 11 to control the primary pressure Ppri and controls the primary pressure Ppri so that an actual pressure Ppri_A of the primary pressure Ppri reaches a command pressure Ppri_D corresponding to the target speed ratio Ratio_D. In this way, the speed ratio Ratio is controlled so that the actual speed ratio Ratio_A reaches the target speed ratio Ratio_D.

A sensor unit 40 detects the actual speed ratio Ratio_A of the variator 20. The sensor unit 40 is specifically constituted by the rotation speed sensors 42 and 43. The actual speed ratio Ratio_A, which is an actual value (sensor value) of the speed ratio detected by the sensor unit 40, is input to the sensor value filter unit 140. The on/off-command is also input to the sensor value filter unit 140 via the on/off-command filter unit 139. The on/off-command filter unit 139 is provided between the sensor value filter unit 140 and the lead compensation on/off determination unit 133 and performs a filtering process of the on/off-command. The on/off-command filter unit 139 is provided in this way due to the arrangement in the signal path.

The on/off-command filter unit 139 constitutes a command smoothing unit configured to smooth a change between the on-command and the off-command of the on/off-command from the lead compensation on/off determination unit 133 when the execution/stop of the lead compensation is switched by performing the filtering process of the on/off-command. The smoothed on/off-command is an on/off-command having a command degree between zero and 1 when the off-command is zero and the on-command is 1. The on/off-command filter unit 139 is specifically a low pass filter unit and, for example, constituted by a first-order low pass filter.

The sensor value filter unit 140 performs a filtering process of the actual speed ratio Ratio_A. In the sensor value filter unit 140, a mode of the filtering process is changed according to the on/off-command. Specifically, an order of the filtering process is switched or the execution/stop of the filtering process is switched according to the on/off-command in the sensor value filter unit 140. The sensor value filter unit 140 is switched to a first-order low pass filter if the off-command is input, and switched to a higher-order low pass filter or stops the filtering process if the on-command is input.

By configuring the sensor value filter unit 140 in this way, a slight delay occurs in a region equal to or lower than a frequency desired to be removed if the first-order low pass filter is used, whereas a delay is improved if the on-command is input. As a result, the phase of the feedback primary command pressure Ppri_FB can be further advanced.

If the smoothed on/off-command is input, the sensor value filter unit 140 changes the filtering process by weighting filtering process modes set at the time of the on-command and at the time of the off-command according to the command degree of the on/off-command. For example, if the on/off-command changes from the off-command to the on-command in the case of switching the execution/stop of the filtering process according to the on/off-command, the filtering process is changed as follows.

Specifically, the filtering process is gradually changed from a filtering process with the weighting of the filtering process by the first-order low pass filter set at 100% and the weighting of the stop of the filtering process, i.e. no filtering process set at 0% to a filtering process with the weighting of the filtering process by the first-order low pass filter set at 0% and the weighting of the stop of the filtering process, i.e. no filtering process set at 100% according to the command degree of the on/off-command.

The sensor value filter unit 140 is equivalent to an actual value filter unit and specifically a low pass filter unit. The sensor value filter unit 140 can include, for example, one or more first-order low pass filters provided to be able to switch the execution/stop or the order of the filtering process. The actual speed ratio Ratio_A is input to the FB compensator 132 from the sensor value filter unit 140.

The peak value frequency determination unit 141 determines the peak value frequency Fpk of the phase lead compensation. The peak value frequency determination unit 141 determines the peak value frequency Fpk according to the speed ratio Ratio. Specifically, the peak value frequency Fpk is set at the PT resonant frequency Fpt determined on the basis of the speed ratio Ratio if the first advance amount Apk1 is input, i.e. if the first-order phase lead compensation is performed.

The peak value frequency Fpk is set to be lower than the PT resonant frequency Fpt if the second advance amount Apk2 is input, i.e. if the second-order phase lead compensation is performed. In this way, a large reduction of the advance amount A in a biased mode by a deviation direction of a frequency deviation between the peak value frequency Fpk and the actual PT resonant frequency Fpt is more improved in the case of performing the second-order phase lead compensation than in the case of performing the first-order phase lead compensation.

Next, main functions and effects of the controller 12 are described.

The controller 12 constitutes a control device for continuously variable transmission for executing a feedback shift control of the transmission 4 so that the actual speed ratio Ratio_A reaches the target speed ratio Ratio_D. The controller 12 includes the first and second phase lead compensators 136, 137 configured to perform the phase lead compensation of the feedback primary command pressure Ppri_FB, the lead compensation on/off determination unit 133 configured to determine to set on or off the phase lead compensation, and the advance amount filter unit 135 serving as the gain smoothing unit configured to smooth a change of the gain G according to the on/off determination of the phase lead compensation.

According to the controller 12 thus configured, a change amount of the gain G associated with the on/off switch of the phase lead compensation can be suppressed by smoothing the change of the gain G. Thus, even if periodic noise corresponding to the hunting of the on/off-command of the phase lead compensation is generated, it can be prevented and suppressed that the gain G increases and the shift control of the transmission 4 becomes unstable due to the input of such noise. Thus, even in the case of on/off-switching of the phase lead compensation, it can be improved that the behavior of the vehicle equipped with the transmission 4 is affected by this.

The controller 12 further includes the advance amount determination unit 134 configured to determine the advance amount Apk according to the on/off determination of the phase lead compensation. The advance amount filter unit 135 configured to perform the filtering process of the advance amount Apk constitutes the gain smoothing unit. According to the controller 12 thus configured, the change of the gain G can be properly smoothed.

The controller 12 further includes the sensor value filter unit 140 configured to perform the filtering process of the actual speed ratio Ratio_A and change the mode of the filtering process according to the on/off determination of the phase lead compensation, and the on/off-command filter unit 139 provided between the sensor value filter unit 140 and the lead compensation on/off determination unit 133 and configured to smooth a change between the on-command and the off-command of the on/off-command from the lead compensation on/off determination unit 133 when the phase lead compensation is on/off-switched.

According to the controller 12 thus configured, it can be further prevented and suppressed that the shift control of the transmission 4 becomes unstable as a result of the actual speed ratio Ratio_A affected by the hunting of the on/off-command even in the case of changing the filtering process mode of the actual speed ratio Ratio_A according to the on/off determination of the phase lead compensation.

Although the embodiment of the present invention has been described above, the above embodiment is merely an illustration of one application example of the present invention and not intended to limit the technical scope of the present invention to the specific configuration of the above embodiment.

In the above embodiment, a case has been described where the advance amount filter unit 135 constitutes the gain smoothing unit. However, the gain smoothing unit may be, for example, constituted by a peak value frequency filter unit provided between the peak value frequency determination unit 141 and the first and second phase lead compensators 136, 137 and configured to perform a filtering process of the peak value frequency Fpk. The peak value frequency filter unit can be, for example, constituted by a first-order low pass filter. The gain smoothing unit may include such a peak value frequency filter unit and the advance amount filter unit 135.

In the above embodiment, a case has been described where the first and second phase lead compensators 136, 137 constitute the lead compensation unit. However, a first-order phase lead compensator may be constituted by a single phase lead compensator such as the first phase lead compensator 136 or the second phase lead compensator 137.

Further, in the above embodiment, a case has been described where the FB compensator 132 for executing the feedback control on the basis of the target speed ratio Ratio_D and the actual speed ratio Ratio_A, i.e. a so-called servo-type feedback control is used. However, a FB compensator for executing not only a servo-type feedback control but also, for example, a feedback control according to a variation of an input torque may be used.

In the above embodiment, a case has been described where the controller 12 is constituted as the control device for continuously variable transmission. However, the control device for continuously variable transmission may be, for example, realized by a plurality of controllers.

The present application claims a priority based on Japanese Patent Application No. 2016-53308 filed with the Japan Patent Office on Mar. 17, 2016, all the contents of which are hereby incorporated by reference.

The invention claimed is:

1. A control device for a continuously variable transmission for executing a feedback control on a basis of an actual value and a target value representing a stability of a speed ratio of the continuously variable transmission with respect to torque vibration, the feedback control calculating a feedback command value for correcting an error between the actual value and the target value, comprising:
   a controller configured to:
      perform a phase lead compensation of the feedback control;
      determine selectively an execution and a stop of the phase lead compensation; and
      smooth a gain change of the phase lead compensation according to a determination as to the execution and the stop of the phase lead compensation when the phase lead compensation is switched between the execution and the stop.

2. The control device for the continuously variable transmission according to claim 1, wherein:
   the controller is further configured to
      determine an advance amount of the phase lead compensation according to the determination as to the execution and the stop of the phase lead compensation; and
      smooth the gain change of the phase lead compensation by performing a filtering process of the advance amount.

3. The control device for the continuously variable transmission according to claim 1, wherein:
   the controller is further configured to:
      perform a filtering process of the actual value and change a mode of the filtering process according to a switching of the phase lead compensation between the execution and the stop; and
      perform a command smoothing between the filtering process of the actual value and the determination as to the execution and the stop of the phase lead compensation, and smooth a change between an execution command and a stop command according to the determination as to the execution and the stop of the phase lead compensation when the phase lead compensation is switched between the execution and the stop.

4. A control method for a continuously variable transmission for executing a feedback control on a basis of an actual value and a target value representing a stability of a speed ratio of the continuously variable transmission with respect to torque vibration, the feedback control calculating a feedback command value for correcting an error between the actual value and the target value, comprising:
   performing a phase lead compensation of the feedback control;
   determining selectively an execution and a stop of the phase lead compensation; and
   smoothing a gain change of the phase lead compensation according to a determination as to the execution and the stop of the phase lead compensation when the phase lead compensation is switched between the execution and the stop.

5. A control device for a continuously variable transmission for executing a feedback control on a basis of an actual value and a target value representing a stability of a speed ratio of the continuously variable transmission with respect to torque vibration, the feedback control calculating a feedback command value for correcting an error between the actual value and the target value, comprising:

phase lead compensation means for performing a phase lead compensation of the feedback control;
execution and stop determination means for determining selectively an execution and a stop of the phase lead compensation; and
gain smoothing means for smoothing a gain change of the phase lead compensation according to a determination as to the execution and the stop of the phase lead compensation when the phase lead compensation is switched between the execution and the stop.

* * * * *